United States Patent [19]
Rode

[11] Patent Number: 5,785,434
[45] Date of Patent: *Jul. 28, 1998

[54] ADJUSTABLE BEARING ASSEMBLY AND ADAPTER SLEEVE THEREFOR

[75] Inventor: John E. Rode, Fonda, N.Y.

[73] Assignee: Temper Corporation, Fonda, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 661,349

[22] Filed: Jun. 14, 1996

Related U.S. Application Data

[62] Division of Ser. No. 191,551, Feb. 3, 1994, Pat. No. 5,549,397.

[51] Int. Cl.⁶ ........................................... F16C 19/38
[52] U.S. Cl. ................................ 384/551; 384/563
[58] Field of Search ........................ 384/563, 551, 384/571, 517, 518, 584

[56] References Cited

U.S. PATENT DOCUMENTS

| | | | |
|---|---|---|---|
| 3,323,844 | 6/1967 | Hedstrom | 384/563 |
| 3,436,134 | 4/1969 | Gordon | 384/563 |
| 3,943,803 | 3/1976 | Hafla | 384/563 |

*Primary Examiner*—Lenard A. Footland
*Attorney, Agent, or Firm*—Heslin & Rothenberg, P.C.

[57] ABSTRACT

An adjustable spacer of the type shaped as a ring for mounting between a pair of tapered bearings mounted on an axle or spindle to allow a load to be axially placed on the bearings is disclosed. The adjustable spacer may include an extension located at a radius from an imaginary axis of the spacer, a contact means oriented radially outward from the extension, and a compressible area located between the contact means and the extension wherein the compressible area deforms when a predetermined load is applied to the ring in the axial direction. The adjustable spacer may be configured to be used with an adapter sleeve for use on axles or spindles of multiple radius.

34 Claims, 5 Drawing Sheets

ADJUSTABLE BEARING ASSEMBLY AND ADAPTER SLEEVE THEREFOR

This application is a division of application Ser. No. 08/191,551 filed Feb. 3, 1994 which application is now U.S. Pat. No. 5,549,397.

TECHNICAL FIELD

This invention relates in general to the field of spindle or axle mounted bearings, and in particular, to an adjustable spacer with radial extension placed between a pair of bearings mounted on an axle or spindle or the like.

BACKGROUND ART

A typical tapered roller bearing may include a bearing cone having an inner bearing race, a plurality of rollers within a roller cage, and an outer bearing race. Typically, a pair of tapered roller bearings, may be mounted on a wheel axle for rotation of the wheel. An adjustable ring or spacer such as that disclosed in commonly owned U.S. Pat. No. 3,774,896 and commonly owned U.S. Pat. No. 4,125,929, each invented by the inventor herein, may be placed between the bearings. Such a spacer contains a compressible area which may comprise a curved section. The adjustable spacer is mounted between two opposed bearings on an axle or spindle to allow a load to be applied on the bearings while maintaining the bearings in a desired axial position. When the bearings are forced towards each other with a predetermined load, the spacer will axially compress.

Typically the area of load distribution of the adjustable spacer is a relatively narrow annular surface which contacts the inner race. Usually the radius of the corner between the side wall of the inner race contacting the spacer and the inner diameter of the inner race contacting the axle or spindle is small enough so that the spacer side wall contacts the flat portion of the side wall of the inner race. If the radial height of the spacer (the difference between the outer diameter of the spacer and inner diameter of the spacer measured from its imaginary central axis) is large enough to contact the flat portion of the side wall of the inner race, proper load distribution through the inner races and spacer may be obtained. In most cases, the contact area between the spacer and inner race side walls is relatively large enough to evenly distribute the force of contact therebetween.

In some case, however, the aforementioned corner radius of the inner race is large relative to the narrow annular surface of contact on the spacer. In such a situation, the distribution of force through contact between the spacer and inner race may occur within the corner radius (curved portion of the inner race near the axle or spindle). When the force of contact through the spacer is applied at the corner radius, the spacer can become wedged between the inner race and the shaft, causing unpredictable increases in the compression force necessary to properly adjust the bearing setting. Additional force may then be needed to adjust the load on the bearing therefore defeating the purpose of providing a constant compression force spacer.

The aforementioned problem could be alleviated by increasing the contact region of the spacer. However, an increase in the contact region is limited by the limits of tool extensions that can be used efficiently to machine the internal groove surface or compressible area of the spacer. The longer the tool required for such machining, the more susceptible it is to breaking by the chip loads of machining. Standard grooving tools, particularly of the type known as tungsten carbide insert tools, are usually only able to machine grooves about 0.100" (2.5 mm) deep. However, since corner radii of bearings are often 50% to 100% larger than this, a solution must be found.

In addition to the aforementioned problem, wheel axle or spindle assemblies may also have a variable diameter. For example, a smaller diameter portion may be located at the end of the axle with a larger diameter portion located at or near the opposite end. A conical portion of the axle may function as a transitional area between the large and small diameter portions. A bearing assembly configuration commonly found in such wheel axle assemblies includes two bearings of different diameters each mounted on the different diameters of the axle. In such a bearing/axle assembly, there may be little or no room for an adjustable spacer adjacent to the smaller diameter bearing. Also, the adjustable spacer may not be capable of being mounted directly between each of the opposed spacers.

Therefore, a need exists for an adjustable spacer which may be used in situations where the radius of curvature between the side wall and inner diameter of the inner race is relatively large compared to the area of contact between the inner race and the adjustable spacer. A need also exists for an adjustable spacer, and/or assembly therefor, which may be used with bearings of different diameters mounted on an axle or spindle having different diameters.

SUMMARY OF THE INVENTION

The aforementioned goals may be achieved using an adjustable spacer constructed in accordance with the principles of the present invention.

An adjustable spacer constructed in accordance with the principles of the present invention is of the type shaped as a ring for mounting between a pair of tapered bearings mounted on an axle or spindle to allow a load to be axially placed on the bearings. The spacer may include a contact means located radially outward from an imaginary axis of the ring, an extension protruding radially inward from the contact means, and a compressible area located between the contact means and the extension wherein the compressible area deforms when a predetermined load is applied to the ring in the axial direction.

The extension should be located about the circumference of the ring and the contact means configured to contact a first inner race of a pair of inner races. Also, the extension should be configured to contact a second inner race of the pair of inner races and may be a substantially flat surface configured to contact a substantially flat surface of the second inner race.

The contact means may be a substantially flat surface configured to contact a substantially flat surface of the first inner race. The contact means may be configured to interface with an adapter sleeve having a first end configured to contact the first race of a pair of inner races. The compressible area may be a curved section extending about the circumference.

The invention also includes an adjustable bearing assembly which may include an adjustable spacer having a contact means extending radially-outward from an imaginary axis of the ring, an extension protruding radially inward from the contact means, and a compressible area located between the contact means and the extension wherein the compressible area deforms when a predetermined load is applied to the ring in the direction of the axis.

The contact means may be a substantially flat surface which contacts a substantially flat surface of the first inner race. The extension may be a substantially flat surface which contacts a substantially flat surface of the second inner race.

3

The aforementioned goals may also be achieved using an adapter sleeve constructed in accordance with the principles of the present invention. The adapter sleeve may have a first end for contacting the first inner race and a second end for contacting an adjustable spacer. The adapter sleeve is placed between two opposite faced tapered roller bearings, which may be of different diameters, mounted on an axle or spindle.

The adapter sleeve may also include a means for receiving the adjustable spacer, or the contact means thereof. The means for receiving the adjustable spacer may include a counter bore which receives the first contact means of the adjustable spacer. The compressible area may include a curved section.

The first inner race may be of a diameter different from the second inner race and the first inner race mounted on a first portion of an axle or spindle having a different diameter than a second portion of the axle or spindle supporting the second inner race. The first inner race, adjustable spacer and second inner race may be mounted on an axle or spindle.

BRIEF DESCRIPTION OF THE DRAWINGS

The invention may best be understood with reference to the following detailed description and drawings in which.

DETAILED DESCRIPTION

Figure 1:
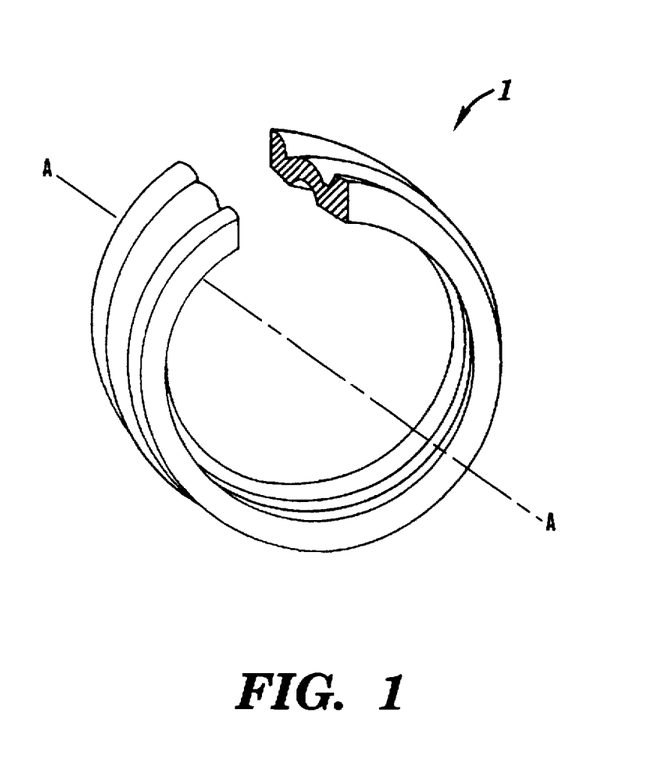
FIG. 1 depicts an isometric view of a ring shaped adjustable spacer having a section removed therefrom.
Figure 2:
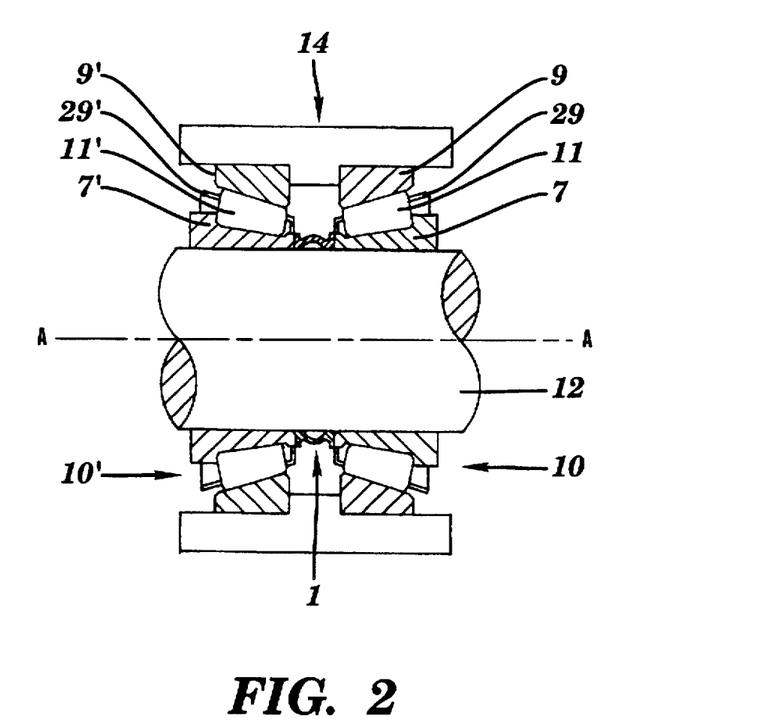
FIG. 2 depicts a sectional view of an axle having a pair of conventional tapered roller bearings with an adjustable spacer mounted thereon.

As shown in FIG. 1 and 2, the mounting of an adjustable spacer between a pair of identical but opposed tapered roller bearings 10, 10' mounted oppositely upon an axle or spindle 12 having a conventional adjustable spacer 1 mounted therebetween is shown. Referring to FIG. 2, a wheel 14 may be mounted on the bearings 10, 10'. However, a rotatable means which is capable of having a wheel affixed thereto may also be mounted on a spindle. Each roller bearing 10, ' contains an inner race 7, 7' which is mounted directly on the axle or spindle and is therefore in the shape of a ring, along with an outer race 9, 9', also in the shape of a ring, and a plurality of roller bearings 11, 11' in a roller cage 29, 29' mounted between the inner race 7, 7' and outer race 9, 9'. The outer race 9 rotates about the inner race 7 by roller bearings 11. Adjustable spacer 1 is capable of compressing in the axial direction along axis A—A when an axial load is applied thereto. Accordingly, referring to FIG. 2, if an axial load is placed on the bearings 10, 10' forcing them towards each other, the adjustable spacer 1 may compress in the axial direction to maintain a load against each of the bearings. The load is typically applied by tightening a nut (not shown) upon the axle or spindle 12.

Figure 3:
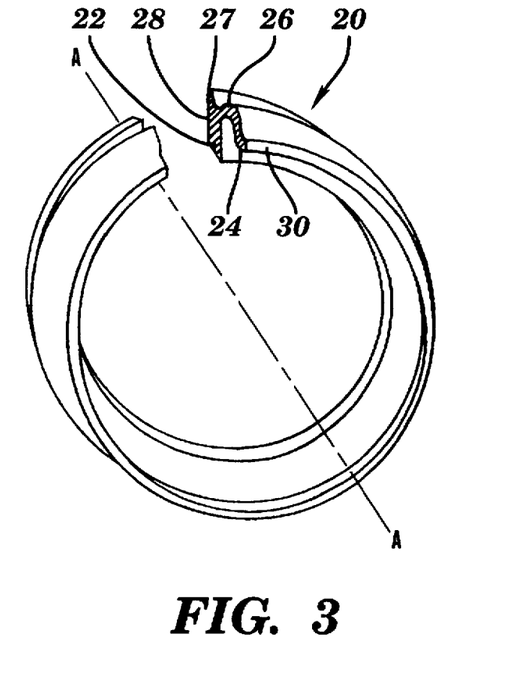
FIG. 3 depicts an isometric view of a ring shaped adjustable spacer with a radial extension having a section removed therefrom and constructed in accordance with the principles of the present invention.
Figure 4:
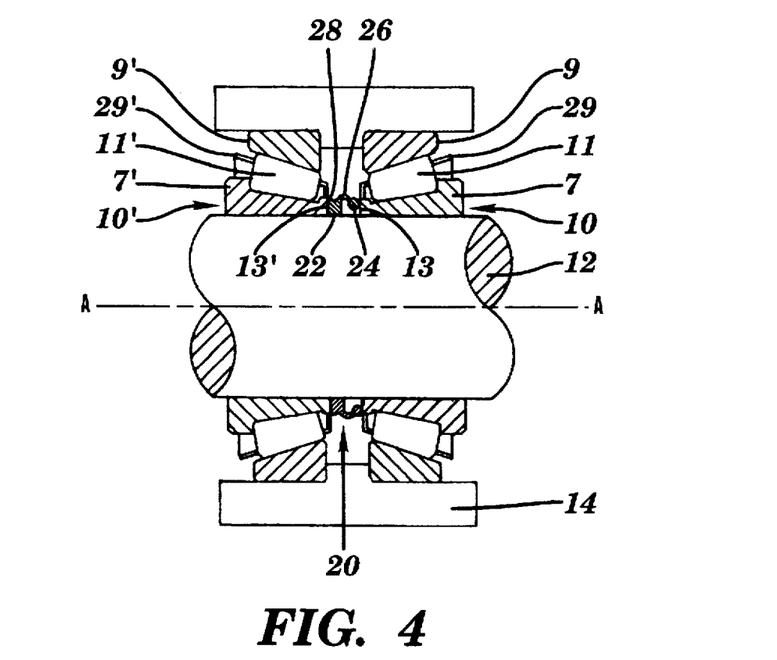
FIG. 4 depicts a sectional view of an axle or spindle containing a pair of conventional tapered roller bearings mounted thereon and further containing an adjustable spacer with radial extension mounted therebetween and constructed in accordance with the principles of the present invention.

Referring to FIG. 3, an adjustable spacer 20 with radial extension 22 constructed in accordance with the principles of the present invention is shown. The adjustable spacer 20 is ring shaped with a contact means 24 located at a particular radius from the axis defining the ring shaped member. The collapsible spacer also contains an extension 22 which is located radially inward from, or relative to, the radius of the contact means. The extension 22 may be referred to as a radially inner extension. The contact means 24 is located at a greater radial distance from the central axis of the adjustable spacer than the extension 22. A compressible area 26 may be located between the contact means 24 and the extension 22. The compressible area deforms when a predetermined load is applied to the adjustable spacer in its axial direction. The compressible area 26, extension 22 and contact means 24 should extend throughout the circumference of the adjustable spacer thereby forming a ring shape. The adjustable spacer should be configured to allow for sufficient contact area between the side wall 28 of the spacer 20 and the flat portion of an abutting inner race. If the radius of the inner race is relatively large the radial extension 22 should be large enough to create an annular surface on side wall 28 which contacts the flat portion of an inner race to prevent the load to be distributed through the corner radius of an inner race (FIGS. 3 and 4). Also, there should be sufficient contact area between the contact means 24 and its abutting inner race 13 (FIG. 4).

The adjustable spacer with the radial extension 22 may be constructed in accordance with the principles disclosed in U.S. Pat. No. 4,067,585 dated Jan. 10, 1978 and U.S. Pat. No. 4,125,929 dated Nov. 21, 1978 each entitled "Deformable Metallic Elements", invented by the inventor herein and assigned to the assignee of the present invention. Both U.S. Pat. Nos. 4,067,585 and 4,125,929 are hereby incorporated by reference and made a part of the disclosure herein. Accordingly, the construction principles of the deformable metallic elements disclosed in the aforementioned patents are useable to construct the adjustable spacer with radial extension made in accordance with the principles of the present invention.

Referring to FIGS. 3 and 4, the extension 22 protrudes radially inward and is preferably located about the circumference of the ring shaped adjustable spacer 20. The contact means 24 should be configured to contact the inner face 13 of an inner race 7 of a bearing. The radial extension 22 should be configured to contact an inner face 13' of an inner race 7'. When the adjustable spacer 20 is mounted between a pair of bearings which are oppositely opposed the contact means 24 will contact an inner face 13 of the first inner race 7 of a first bearing and the extension will contact an inner face 13' of the second inner race 7' of the second bearing. The radial extension may also be configured to contact the axle or spindle 12. The extension 22 may include or be defined by side wall 28 being of a substantially flat surface which will contact a substantially flat surface of the inner face 13' an inner race 7' of a bearing assembly 10'. The side wall 28 should include the narrow annular surface of force distribution between the spacer 20 and inner race 7'. Also, the contact means 24 may include a substantially flat surface 30 to contact a substantially flat surface at the inner face 13 of the inner race 7. Inner radial extension 22 functions to centrally locate ring spacer 20 on the shaft and to distribute the load to the inner race.

Referring to FIG. 4, an axle or spindle 12 may contain a pair of oppositely opposed bearings 10, 10'. The first bearing 10 contains a first inner race 7 and a first outer race 9, each of the inner and outer race being ring shaped and containing a plurality of rollers 11 mounted therebetween to allow for rotation of the outer race 9 relative to the inner race 7. The second bearing 10' is identical to the first bearing 10 and likewise contains a second inner race 7' along with an outer race 9' with a plurality of rollers 11' mounted therebetween. The second bearing is identical to the first bearing 10 but is mounted to the oppositely faced the first bearing 10.

Figure 5:
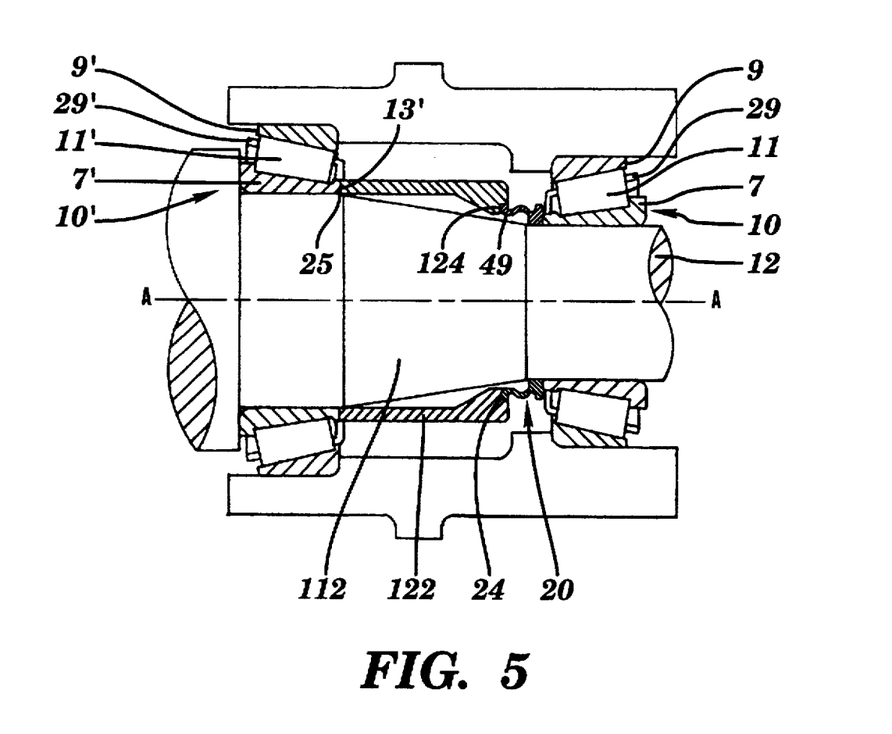
FIG. 5 depicts a sectional view of an axle or spindle having a pair of tapered roller bearings mounted thereon, each roller bearing being of different diameter and mounted on a section of the axle or spindle having a different diameter, and an alternative embodiment of an adjustable spacer with radial extensions and an adapter sleeve mounted between each of the bearings on the axial or spindle in accordance with the principles of the present invention.

Referring to FIG. 5, the adjustable spacer 20 may be constructed to be part of an assembly of an axle or spindle having two different diameters. A first bearing assembly 10 may be located on the smaller diameter portion of the axle while a second bearing assembly 10' of larger diameter may be mounted on the larger diameter portion of the axle. Typically, a conical section 112 functions as a transitional area between the large diameter and small diameter sections of the axle. In such a configuration, an adapter sleeve 122 may be mounted along with the adjustable spacer 20 between the bearing assemblies 10, 10'. The adapter sleeve 122 may contain a means for receiving the adjustable spacer 20 including the contact means 24 of the spacer 20. The adjustable spacer may be configured so that the contact means 24 fits within the receiving means. For example, the contact means 24 may be configured as a shoulder 49. The means for receiving the contact means 24 may comprise a counter bore 124 configured to be complimentary with contact means 24 of the adjustable spacer. For example, in FIG. 5, the shoulder 49 fits within the counterbore 124.

Preferably, the counter bore 124 or other suitable receiving means is located at a first end of the adapter sleeve configured so that a surface thereon its complimentarily with the contact means 24 so as to evenly distribute the force therethrough. For example, the contact means 24 of the adjustable spacer may contain a flat surface 30 (FIG. 3) which contacts a flat inner surface of the counter bore 124 to evenly distribute the load therethrough and avoid uneven areas of stress. The adapter sleeve 122 may have a second end configured to contact the first inner race 7'. Preferably, this first end comprises a substantially flat portion 25 which contacts the inner face 13' of the first inner race 7'. The inner face 7' preferably also contained substantially flat surfaces to evenly distribute the load therebetween. As shown in FIGS. 3 and 5, the adjustable spacer 20 may also contain a radially outer extension 27. The radially outer extension 27 helps prevent rotational distortion of the radial extension and spacer and helps stabilize the structure of the spacer 20. The radially outer extension 27 may be desirable at relatively high loads.

The construction of the adjustable spacer may vary. However, it is preferred to have a contact means 24 configured to allow the force to be evenly distributed between the contact means 24 and the inner face of the first inner race 7. Substantially flat surfaces for force contact are preferred. However, other surfaces may also be used and the invention is not limited to any particular surface or ring configuration. The contact means 24, compressible section 20 and radial extension 22 are typically integrally formed to create a ring-shaped adjustable spacer 20. Such a configuration enables the even distribution of the load therethrough thereby minimizing areas of uneven stress distribution.

Figure 6:
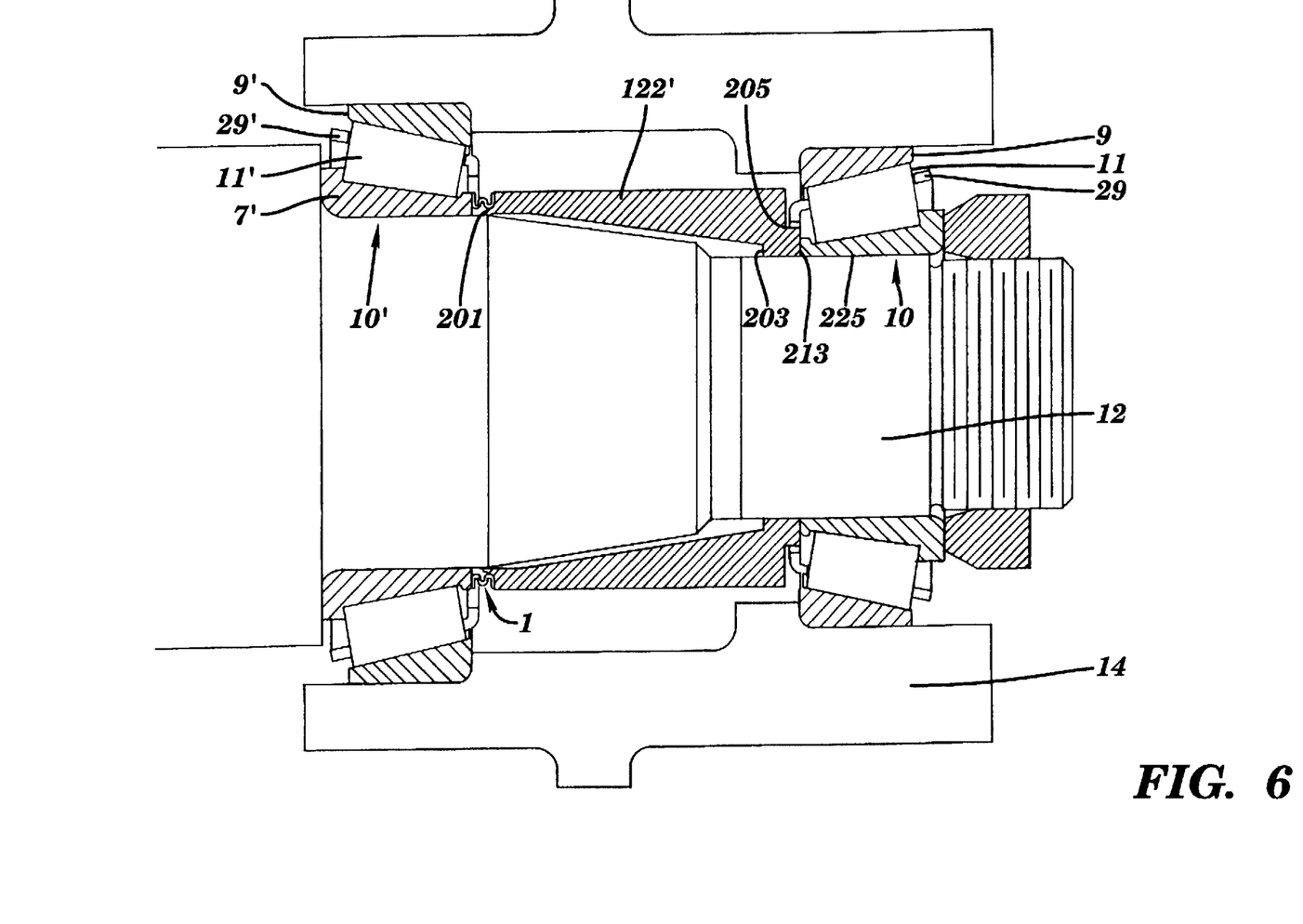
FIG. 6 depicts a sectional view of an axle or spindle having a bearing assembly thereon with a pair of oppositely faced tapered roller bearings of different diameter with a conventional adjustable spacer and adapter sleeve constructed in accordance with the principles of the present invention mounted therebetween.

Referring to FIG. 6, an alternative configuration of mounting an adjustable spacer 1 between a pair of oppositely faced roller bearings mounted on an axle or spindle 12 having a first and second diameter is shown. In this configuration, an alternative embodiment of an adapter sleeve, adapter sleeve 122' contains a first end with a means for receiving an adjustable spacer of the type shown in FIG. 1 therein. The means may comprise a radially outer lip 201 extending along the circumference of the first end of the adapter sleeve. The radially outer lip 201 may be sized to receive a collapsible spacer 1 such as those shown in U.S. Pat. Nos. 3,774,896, and 4,125,929. The adapter sleeve 122' may have a radially inner collar 203 located at a second end thereof. The second end has a contact area 225 that contacts the inner face 213 of inner race 7. The radially inner collar 203 forms an inner diameter at the second end of the adapter sleeve that is smaller than the diameter of the first end of the adapter sleeve 122'. The radially inner collar 203 is mounted on the smaller diameter section of the axle or spindle 12. The adapter sleeve 122' may also include a radially outer lip 205 on the second end. The radially outer lip allows a roller bearing cage 29 of the bearing assembly 10 to fit therearound. The radially inner collar 203 on the second end of the adapter sleeve should be sized to fit snugly upon the smaller diameter of the axle or spindle so as to prevent radial movement of the adapter sleeve 122'.

Although the invention has been described with reference to the embodiments depicted herein, it is apparent to one skilled in the art that various modifications may be made without departing in any way from the spirit of the invention. For example, various other adjustable spacer configurations may be used. Any such modifications or configurations are intended to be within the scope of the invention as defined in the following claims.

What is claimed is:

1. An adjustable bearing assembly comprising:
   a pair of oppositely faced tapered roller bearings mounted on a multi-diameter axle or spindle;
   an adapter sleeve located around a first diameter of said multi-diameter axle or spindle and disposed between said oppositely faced tapered roller bearings;
   an adjustable spacer ring having a compressible area therein located around a second diameter of said multi-diameter axle or spindle and disposed between one of said tapered roller bearings and said adapter sleeve.

2. The adjustable bearing assembly of claim 1 wherein said adjustable spacer ring is disposed between a first roller bearing of said pair of roller bearings and said adapter sleeve, said first roller bearing being disposed on said first diameter of said axle or spindle.

3. The adjustable bearing assembly of claim 2 wherein said first diameter of said axle or spindle is larger than said second diameter of said axle or spindle having a second of said pair of roller bearings thereon.

4. The adjustable bearing assembly of claim 3 wherein said first diameter of said axle or spindle is smaller than said second diameter of said axle or spindle having a second of said pair of roller bearings thereon.

5. The adjustable bearing assembly of claim 3 wherein said adjustable spacer ring is disposed between an outer lip of a first end of said adapter sleeve.

6. The adjustable bearing assembly of claim 5 wherein a second end of said adapter sleeve comprises a radially inner collar disposed on said second diameter of said axle or spindle.

7. The adjustable bearing assembly of claim 4 wherein said adjustable spacer ring is disposed in a counter bore at one end of said adjustable spacer ring.

8. The adjustable bearing assembly of claim 7 wherein the opposite end of said adapter sleeve contacts said second roller bearing.

9. The adjustable bearing assembly of claim 1 further comprising:

an adjustable spacer having a contact means extending radially outward from an imaginary axis of said ring, an extension oriented radially inward from said contact means, said compressible area being located between the contact means and the extension wherein said compressible area deforms when a predetermined load is applied to said ring in the direction of said axis;

a first inner race of a first roller bearing contacting said contact means; and a second inner race of a second roller bearing contact said extension.

10. The bearing assembly of claim 9 wherein said contact means comprises a substantially flat surface which contacts a substantially flat surface of the first inner race.

11. The bearing assembly of claim 10 wherein said extension comprises a substantially flat surface which contacts a substantially flat surface of the second inner race.

12. The bearing assembly of claim 10 wherein said adapter sleeve comprises a first end contacting said first inner race and a second end contacting the adjustable spacer.

13. The bearing assembly of claim 12 wherein the extension of said adjustable spacer contacts said second inner race.

14. The bearing assembly of claim 13 wherein the adapter sleeve further comprises a means for receiving the contact means of the adjustable spacer.

15. The bearing assembly of claim 14 wherein said means for receiving the adjustable spacer comprises a counter bore which receives the contact means of the adjustable spacer.

16. The bearing assembly of claim 9 wherein said compressible area comprises a curved section.

17. An adjustable bearing assembly comprising an adapter sleeve disposed between a pair of oppositely faced tapered roller bearings mounted on a multi-diameter axle or spindle, said adapter sleeve comprising:

a first end having a means for receiving an adjustable spacer ring therein, said adjustable spacer ring received by said first end being coaxially mounted around a first diameter of one of an axle or spindle;

a second end having a contact area thereon for contacting an inner face of a first inner race of a first tapered roller bearing mounted on a second diameter of one of an axle or spindle.

18. The adjustable bearing assembly of claim 17 wherein said means for receiving an adjustable spacer ring therein comprises a radially outer lip.

19. The adjustable bearing assembly of claim 17 wherein the second end of said adapter sleeve comprises a radially inner collar mountable on said second diameter.

20. The adjustable bearing assembly of claim 34 wherein said adapter sleeve further comprises a radially outer lip on the second end adapted to receive a roller cage of a bearing thereover.

21. An adapter sleeve mounted between a pair of oppositely faced tapered roller bearings mounted on a multi-diameter axle or spindle comprising:

a first end having a means for receiving an adjustable spacer ring therein, said adjustable spacer ring received by said first end being coaxially mounted around a first diameter of one of an axle or spindle;

a second end having a contact area thereon for contacting an inner face of a first inner race of a first tapered roller bearing mounted on a second diameter of one of an axle or spindle.

22. The adapter sleeve of claim 21 wherein the second end comprises a radially inner collar mountable on said second diameter.

23. The adapter sleeve of claim 21 or 22 further comprising a radially outer lip on the second end capable of allowing a roller cage of a bearing to fit thereover.

24. The adapter sleeve of claim 21 wherein said adapter sleeve is mounted between a first and second oppositely faced tapered roller bearings mounted on one of an axle and spindle having a first diameter and a second diameter.

25. The adapter sleeve of claim 21 wherein said adjustable spacer ring is mounted between an inner face of an inner race of said second bearing and said sleeve.

26. The adapter sleeve of claim 25 wherein the adjustable spacer ring comprises:

a contact means located at a particular radius from an imaginary axis of said spacer ring;

an extension oriented radially inward from the contact means;

a compressible area located between the contact means and the extension wherein said compressible area deforms when a predetermined load is applied to said ring in the axial direction.

27. The adapter sleeve of claim 26 wherein the extension is located about the circumference of said ring.

28. The adapter sleeve of claim 27 wherein said contact means is configured to contact a first inner race of a pair of inner races in said bearings.

29. The adapter sleeve of claim 28 wherein said extension is configured to contact a second inner race of said pair of inner races.

30. The adapter sleeve of claim 28 wherein said contact means comprises a substantially flat surface configured to contact a substantially flat surface of said first inner race.

31. The adapter sleeve of claim 30 wherein said extension comprises a substantially flat surface configured to contact a substantially flat surface of said second inner race.

32. The adapter sleeve of claim 30 wherein said contact means is configured to interface with an adapter sleeve having a first end configured to contact a first race of a pair of inner races.

33. The adapter sleeve of claim 26 wherein said compressible area comprises a curved section.

34. The adapter sleeve of claim 21 wherein said means for receiving an adjustable spacer ring therein comprises a radially outer lip.

* * * * *

UNITED STATES PATENT AND TRADEMARK OFFICE
CERTIFICATE OF CORRECTION

PATENT NO. : 5,785,434
DATED : July 28, 1998
INVENTOR(S) : Rode, John E.

It is certified that error appears in the above-identified patent and that said Letters Patent is hereby corrected as shown below:

<u>In the claims:</u>

Claim 7, line 3, delete "adjustable spacer ring" and replace with --adapter sleeve--.

Claim 9, line 16, after "bearing" insert --of said roller bearings--;
line 17, delete "contact means" and replace with --adapter sleeve--;
line 18, after "bearing" insert --of said roller bearings--; delete "contact" and replace with --contacting--.

Claim 10, line 22, delete "first inner race" and replace with --adapter sleeve--.

Claim 20, line 59, delete "34" and replace with --17--.

Claim 24, line 20, delete "a";
line 21, delete "and" and replace with --or--.

Claim 28, line 41, delete "a first inner race of a pair of inner races in said bearings" and replace with --said adapter sleeve--.

Claim 29, line 44, delete "said" and replace with --a--;
line 45, after "races" insert --in said bearings--.

Claim 30, line 48, delete "first inner race" and replace with --adapter sleeve--.

Claim 31, line 51, delete "said" and replace with --a--; after "race" insert --of a pair of inner races in said bearings--.

Signed and Sealed this

Thirteenth Day of July, 1999

Attest:

Q. TODD DICKINSON

Attesting Officer

Acting Commissioner of Patents and Trademarks